（12）United States Patent
Teggatz et al.

(10) Patent No.: US 9,083,391 B2
(45) Date of Patent: Jul. 14, 2015

(54) WIRELESS POWER TRANSCEIVER SYSTEM

(75) Inventors: Ross E. Teggatz, McKinney, TX (US);
Wayne T. Chen, Plano, TX (US); Amer Atrash, Richardson, TX (US)

(73) Assignee: TRIUNE SYSTEMS, LLC, Richardson, TX (US)

( * ) Notice: Subject to any disclaimer, the term of this patent is extended or adjusted under 35 U.S.C. 154(b) by 761 days.

(21) Appl. No.: 13/355,416

(22) Filed: Jan. 20, 2012

(65) Prior Publication Data

US 2012/0187772 A1 Jul. 26, 2012

Related U.S. Application Data

(60) Provisional application No. 61/434,622, filed on Jan. 20, 2011.

(51) Int. Cl.
*H01F 38/14* (2006.01)
*H04B 5/00* (2006.01)

(52) U.S. Cl.
CPC .............. *H04B 5/0031* (2013.01); *H01F 38/14* (2013.01); *H04B 5/0037* (2013.01); *H04B 5/0093* (2013.01)

(58) Field of Classification Search
CPC .................................. H01F 38/14; H04B 5/00
USPC .................................................. 307/104, 150
See application file for complete search history.

(56) References Cited

U.S. PATENT DOCUMENTS 5,686,813 A * 11/1997 Huen et al. .................... 307/150
7,650,187 B2 * 1/2010 Gruber et al. .................... 607/33

* cited by examiner

*Primary Examiner* — Hal Kaplan
(74) *Attorney, Agent, or Firm* — Jackson Walker L.L.P.; Christopher J. Rourk

(57) ABSTRACT

Coupled coil systems and methods are disclosed in which transmitter and receiver inductors, or coils, are coupled in a configuration for wirelessly transferring power among them. In preferred implementations, power may be transmitted and received using temporarily paired coupled coils. One preferred aspect of the invention is that the coils are not permanently affixed in physical proximity to one another, but can be moved and/or interchanged, and that the coils may be used to transmit or receive power based on their real-time relationships to other coils.

24 Claims, 3 Drawing Sheets

WIRELESS POWER TRANSCEIVER SYSTEM

PRIORITY ENTITLEMENT

This application is entitled to priority based on Provisional Patent Application Ser. No. 61/434,622 filed on Jan. 20, 2011, which is incorporated herein for all purposes by this reference. This application and the Provisional Patent Application have at least one common inventor.

TECHNICAL FIELD

The invention relates to coupled inductor systems. More particularly, the invention relates to inductively coupled coil systems for use in wireless power transfer applications. In preferred embodiments, the invention relates to the wireless transmission of power among coupled inductor coils. In preferred embodiments, the invention relates to the more efficient utilization of energy resources.

BACKGROUND

Portable electronics apparatus commonly requires a portable power storage device such as a battery or battery pack to supply power for operation. When the batteries are discharged, they must be recharged again in order for the apparatus to resume operation. Wireless power transfer presents a convenient way to charge power storage devices without the need for a wired power connection. However, a device may also need to be recharged when a wired power base station is not available. In these situations, it is desirable to have a portable wireless charging capability. Existing wireless power transmission systems utilize coupled inductor coils to transfer power from a charging coil to a receiving coil. Some of the systems known in the art also transmit data as well as power. Typically such systems use a dedicated power transmission coil, or set of coils on a primary charger side. One or more dedicated receiving coils are provided in association with each battery on a secondary side. Among the problems with such systems is the requirement of providing compatible charging stations in numbers proportional to the number of batteries to be charged.

Due to these and other problems and potential problems, improved coupled inductor power transceiver systems would be useful and advantageous contributions to the arts.

SUMMARY OF THE INVENTION

In carrying out the principles of the present invention, in accordance with preferred embodiments, the invention provides advances in the arts with novel apparatus directed to the transfer of power among power packs using inductive couplings. In preferred embodiments, systems include capabilities for bidirectional power transfer, and for data transfer more than sufficient to manage power functions.

According to aspects of the invention, examples of preferred embodiments include a wireless power transceiver system having first and second power packs coupled by a wireless interface adapted to transmit power and data between the second power pack and the first power pack.

According to aspects of the invention, examples of preferred embodiments include wireless power transceiver systems having first and second power packs coupled by a wireless interface adapted to transmit power and data between them wherein the power packs are configured to operate in either a power transmission mode or in a power receiving mode.

According to aspects of the invention, examples of preferred embodiments include wireless power transceiver systems having first and second power packs coupled by a wireless interface adapted to transmit power and data between them wherein the power packs are configured to operate in either a data transmission mode or in a data receiving mode.

According to aspects of the invention, examples of preferred embodiments include wireless power transceiver systems having first and second power packs coupled by a wireless interface adapted to transmit power and data between them wherein the first power pack and the second power pack are interchangeable.

According to another aspect of the invention, preferred embodiments of wireless power transceiver systems include power packs having a power storage unit and a wireless interface configured for transmitting and receiving power.

According to another aspect of the invention, preferred embodiments of wireless power transceiver systems include power packs having a wireless interface configured for transmitting and receiving data.

According to another aspect of the invention, preferred embodiments of wireless power transceiver systems include power packs having a battery and/or capacitor power storage unit.

The invention has advantages including but not limited to one or more of, improved coupled coil charging system efficiency, convenience, compatibility, and reduced costs. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

Figure 1:
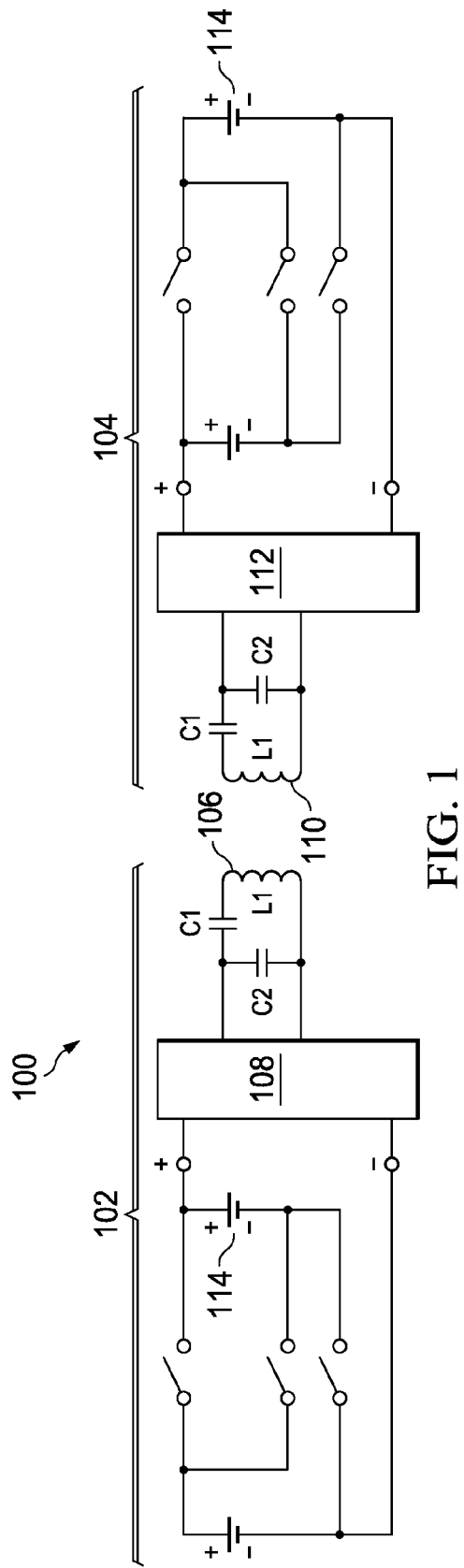
FIG. 1 is a simplified schematic diagram of a coupled inductor wireless power transceiver system illustrating an example of a preferred embodiment of the invention.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

The present patent application is related to U.S. patent application Ser. No. 13/309,423 which shares at least one common inventor with the present application and has a common assignee. Said related application is hereby incorporated herein for all purposes by this reference.

It has been determined that power may be transferred bi-directionally among coupled coils. Generally, using inductive coupling, a primary coil is positioned in proximity to a secondary coil. The primary and secondary coils are properly oriented and positioned so that they may be electromagnetically coupled in order to facilitate a transfer of energy between them. Generally, one primary coil is used with one secondary coil, and secondary side systems are designed to resonate at a particular frequency. This allows for more efficient transfer of energy at that particular frequency. The inventors have devised novel and useful coupled inductor transceiver systems and methods using inductor coils. The inductive coils of the system can be dynamically coupled for either transmitting or receiving based on operational considerations. In preferred embodiments of the invention, a wireless power system may selectably operate as either a power transmitter or a power receiver. One example of a preferred embodiment is a power pack having batteries as an energy storage medium. The power pack may be placed in close proximity to a wireless primary side charger in order to charge the batteries within the power pack. The same wireless interface that enables the charging of the first power pack may subsequently be used to charge a different device having a second power pack, wherein the first power pack functions as a primary side wireless charger.

The systems of the invention preferably also include wireless data transmission functions as well as wireless power transmission. Each of the coils in the system is preferably connected with additional circuitry designed for transmitting and receiving data signals. The power packs typically reside in electronic apparatus of various kinds For example, communication, computer, battery, imaging, or other portable apparatus, to cite a few examples, may be equipped with wireless power transceiver systems according to the invention. In operation, power packs are positioned within their respective apparatus such that they may be placed in physical proximity with other power packs or standalone chargers having the necessary components to complete a wireless interface for inductive coupling such that the coils are in communication with one another for the exchange of power and/or data. The system drives the primary coil on one side to transmit, and receives at the secondary coil on the other side of the wireless interface. Such systems can be utilized for data transfer as well as power transfer. The transceiver apparatus of the invention may be implemented as desired for a particular application depending upon its power and data requirements, using suitable communications equipment in combination with the inductive coil data transmission system.

An example of a preferred embodiment of a wireless power transceiver system 100 for wireless power transfer according to the invention is shown in FIG. 1. The system 100 includes a primary side power pack 102 for providing one or more signals to a secondary side power pack 104. The primary side power pack 102 has a primary coil 106 and driver circuitry 108. The secondary side power pack 104 has a secondary coil 110 and receiver circuitry 112 for receiving signals from the primary side power pack coil 106. It should be understood that the invention contemplates that the primary side and secondary side power packs may be implemented in configurations such that their functions are reversible, i.e., either side power pack of the system may operate as either a primary side power pack or secondary side power pack, depending upon the application. In alternative embodiments, two or more primary and/or secondary coils may be used instead of a single coil without departing from the principles of the invention. The power storage unit of the power packs, 102, 104, here exemplified by batteries 114, may include multiple batteries and/or capacitors in various configurations.

Figure 2:
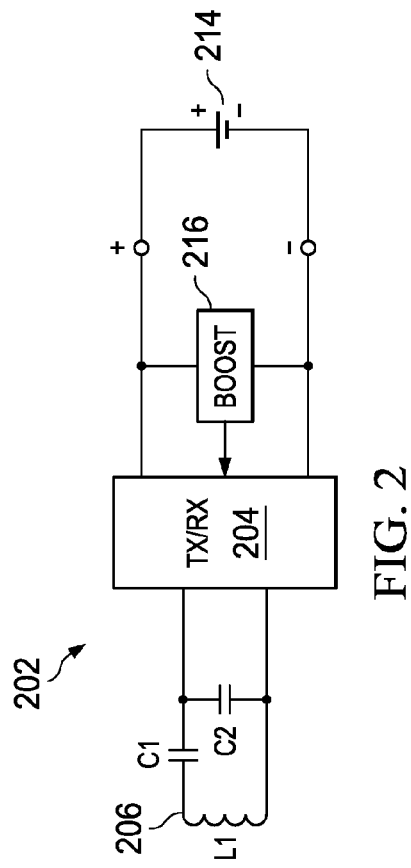
FIG. 2 is a schematic diagram of an example of an alternative preferred embodiment of a power pack of a wireless power transceiver system according to the invention.

Now referring primarily to FIG. 2, in this example of a preferred embodiment of a power pack 202, the transceiver 204 may require to boost the battery 214 voltage in order to create sufficient drive voltage to drive the wireless power coil 206. This can be done with a boost regulator 216 as shown, or alternatively with a charge pump, or other power converter. Alternatively, if the power pack contains multiple battery cells as shown in FIG. 1, the cells 114 may selectably be reconfigured to a parallel or series configuration in order to increase the maximum voltage available when used in a power transmitting mode.

Figure 3:
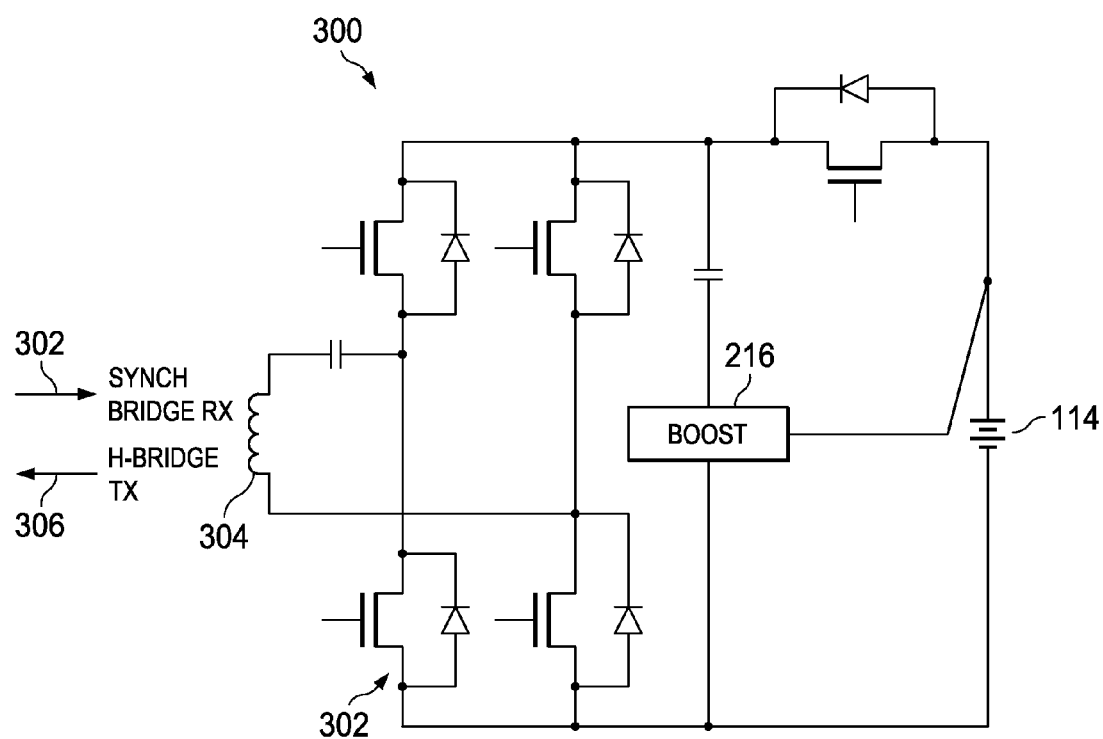
FIG. 3 is a simplified schematic view illustrating an example of an alternative preferred embodiment of a power pack of a wireless power transceiver system according to the invention.

FIG. 3 illustrates a schematic of an alternative preferred embodiment of a power pack 300. The receiving circuitry in this example includes a full-bridge rectifier 302 for receiving power on the coil 304. For implementing transmitting functions, the bridge full-rectifier 302 may be reconfigured to drive the coil 304 as a power transmitter in a half-bridge configuration 306.

It should be appreciated by those skilled in the applicable arts that many variations are possible within the scope of the invention. In addition to the capability for transferring power, the power pack may include circuitry for transmitting and receiving data signals through the coil as well. Additionally, or alternatively, the transmit/receive functionality may be integrated into apparatus having a battery pack associated with it, provided that the components and functionality of the wireless power transceiver system as shown and described are included. The exemplary battery pack may be removable or fixed within associated apparatus and systems. An example of a representative implementation is the deployment of the system in cell phones. Given two or more cell phones suitably configured with system components, one cell phone may be used to wirelessly charge a second phone. The power packs of the system may optionally have coils located on one or multiple sides, facilitating the completion of wireless interfaces to permit charging and/or data transfer in any of several different physical orientations. The power packs are preferably capable of receiving power from any of a number of power sources, including inductively coupled, capacitively coupled, solar, piezo-electric, or other power source across a wired or wireless interface. In some applications, an energy harvesting source such as for example, solar, thermal, or piezo-electric power generators may be integrated into the power pack. A power pack used as a primary charger may draw upon an external power source and/or its internal power storage unit(s) to charge other power packs or batteries positioned in proximity for magnetic coupling.

Figure 4:
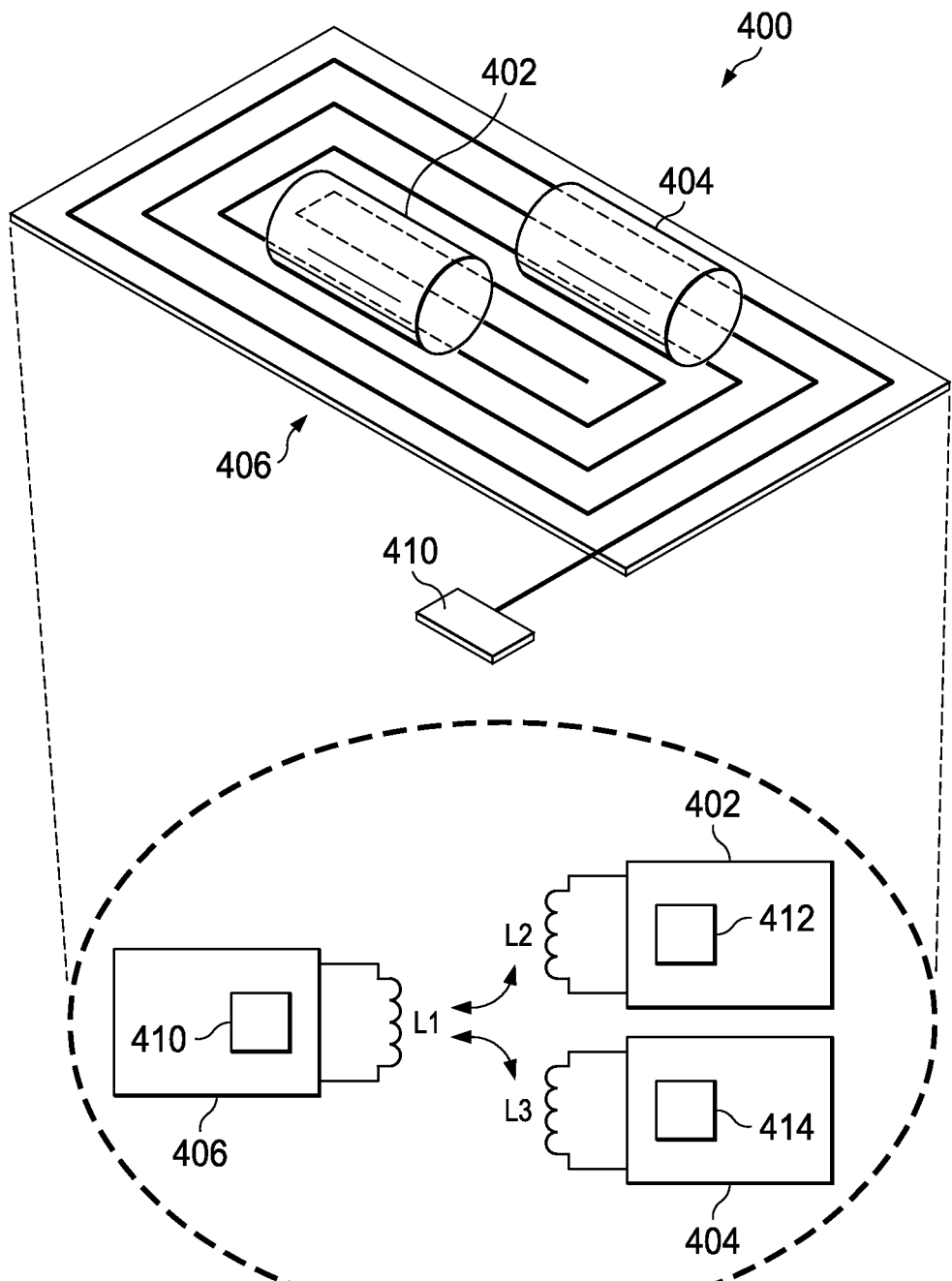
FIG. 4 is a simplified schematic diagram of a wireless power transceiver system illustrating an example of a preferred embodiment of the invention.

An additional example of the operation of the wireless power transceiver system is shown in FIG. 4. Multiple power packs, e.g., 402, 404 may be operated in a wireless power transceiver system 400. A wireless charging power pack 406 is shown in this example. This power pack 406 may be a dedicated charging pad, or may be a transceiver. Multiple power packs 402, 404, operating in the power receiving mode are placed in positions for inductively coupling over a wireless interface among themselves or with an external charger or power pack 406 operating in the power transmission mode. The wireless power transceiver system 400 in this case is required to differentiate between the different power packs 402, 404, and their real-time operational modes. In this case, it may be left up to the power packs 402, 404 to manage their charging and prevent over-charging by using their transceiver circuitry 412, 414, respectively. Data communication between the power packs 402, 404, 406 facilitates mutually beneficial operation. In a communication between a single power pack 402 receiver 412 and a single power pack 404 transmitter 414, the receiver modulates its load to cause a modulation in the input current or voltage of the transmitter. This is done to send data packets periodically. An additional receiver, e.g. 410, provided in the system 400 monitors the change in the transmitted signal caused by the first receiver 412. The additional receiver 410 monitors the communication between the first receiver 412 and the transmitter 414. The additional receiver 410 then may interject itself into the communication link by sending a data packet at a time that the first transmitter 414 is not transmitting data. The system 400 may be extended to include additional power packs beyond the three of this example. Using this system 400, any receiving power pack may indicate an end of charge if needed. A power pack may also place itself into a mode where it stops charging without preventing the charging of any other power pack in the system. This same technique can be applied to any number of power packs in various combinations, such as one power pack charging two others, two power packs contributing to the charge of another, and so forth. In order to facilitate efficient startup of the system 400, the power packs preferably employ an arbitrary wait time before responding to a ping. In the event multiple power packs are present, this prevents collision of power pack responses to the ping. If there is a collision, each power pack can preferably waits for an additional random delay before initiating a response. The power packs in a system may communicate directly with one another, or with a dedicated charging station, using a wireless data transmission. Potentially useful transmission techniques may include may be RF, inductive, capacitive, or other wireless data communication techniques.

While the making and using of various exemplary embodiments of the invention are discussed herein, it should be appreciated that the present invention provides inventive concepts which can be embodied in a wide variety of specific contexts. It should be understood that the system and methods of the invention may be practiced with coupled inductor systems having communications and power transfer functionality, such as in battery chargers, power converters, portable electronics, and the like. Alternative applications for the wireless power transceiver system include implementations for charging and/or drawing power from vehicles, for example. For purposes of clarity, detailed descriptions of functions, components, and systems familiar to those skilled in the applicable arts are not included. The methods and apparatus of the invention provide one or more advantages including but not limited to, data transfer capabilities, managed power transfer capabilities, and enhanced energy utilization and conservation attributes. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:
1. A wireless power transceiver system comprising:
a first power pack;
a second power pack coupled with the first power pack by a wireless interface adapted to transmit power between the second power pack and the first power pack; and
whereby, data may be transmitted over the wireless interface wherein the first power pack is adapted to operate in a power transmission mode.

2. A wireless power transceiver system according to claim 1 wherein the first power pack module is adapted to operate in a power receiving mode.

3. A wireless power transceiver system according to claim 1 wherein the first power pack is adapted to operate in a data transmission mode.

4. A wireless power transceiver system according to claim 1 wherein the first power pack is adapted to operate in a data receiving mode.

5. A wireless power transceiver system according to claim 1 wherein the second power pack is adapted to operate in a power transmission mode.

6. A wireless power transceiver system according to claim 1 wherein the second power pack is adapted to operate in a power receiving mode.

7. A wireless power transceiver system according to claim 1 wherein the second power pack is adapted to operate in a data transmission mode.

8. A wireless power transceiver system according to claim 1 wherein the second power pack is adapted to operate in a data receiving mode.

9. A wireless power transceiver system according to claim 1 wherein the power packs each further comprises a battery.

10. A wireless power transceiver system according to claim 1 wherein the power packs each further comprises a capacitor.

11. A wireless power transceiver system according to claim 1 wherein the wireless interface comprises at least two coils.

12. A wireless power transceiver system according to claim 1 wherein the first power pack and the second power pack are interchangeable.

13. A power pack comprising:
a power storage unit; and
a wireless interface coupled with the power storage unit;
wherein the wireless interface is configured for receiving power and for transmitting power.

14. A power pack according to claim 13 wherein the wireless interface is adapted to operate in a power transmission mode.

15. A power pack according to claim 13 wherein the wireless interface is adapted to operate in a power receiving mode.

16. A power pack according to claim 13 wherein the wireless interface is adapted to operate in a data transmission mode.

17. A power pack according to claim 13 wherein the wireless interface is adapted to operate in a data receiving mode.

18. A power pack according to claim 13 wherein the power pack is adapted to operate in a power transmission mode.

19. A power pack according to claim 13 wherein the power pack is adapted to operate in a power receiving mode.

20. A power pack according to claim 13 wherein the power pack is adapted to operate in a data transmission mode.

21. A power pack according to claim 13 wherein the battery pack is adapted to operate in a data receiving mode.

22. A power pack according to claim 13 wherein the power storage unit further comprises a battery.

23. A power pack according to claim 13 wherein the power storage unit further comprises a capacitor.

24. A power pack according to claim 13 wherein the wireless interface comprises at least one coil.

* * * * *